US009807146B2

(12) United States Patent
Song et al.

(10) Patent No.: US 9,807,146 B2
(45) Date of Patent: Oct. 31, 2017

(54) SYSTEM AND METHOD FOR PROVIDING CLOUD BASED USER INTERFACES

(71) Applicant: Alticast Corporation, Seoul (KR)

(72) Inventors: Moon Kyu Song, Seongnam-si (KR); Hyun Il Jung, Seoul (KR); Woo Hyuck Kim, Hwaseong-si (KR)

(73) Assignee: Alticast Corporation, Seoul (KR)

( * ) Notice: Subject to any disclaimer, the term of this patent is extended or adjusted under 35 U.S.C. 154(b) by 117 days.

(21) Appl. No.: 14/646,949

(22) PCT Filed: Dec. 23, 2014

(86) PCT No.: PCT/KR2014/012679
§ 371 (c)(1),
(2) Date: May 22, 2015

(87) PCT Pub. No.: WO2016/080585
PCT Pub. Date: May 26, 2016

(65) Prior Publication Data
US 2016/0142468 A1 May 19, 2016

(30) Foreign Application Priority Data

Nov. 19, 2014 (KR) .................. 10-2014-0161814

(51) Int. Cl.
G06F 15/16 (2006.01)
H04L 29/08 (2006.01)
H04L 29/06 (2006.01)
H04N 21/633 (2011.01)

(52) U.S. Cl.
CPC .......... *H04L 67/025* (2013.01); *H04L 65/604* (2013.01); *H04L 67/14* (2013.01); *H04N 21/633* (2013.01)

(58) Field of Classification Search
CPC ............. H04N 21/4516; H04N 21/482; H04N 21/637; H04N 21/8166
See application file for complete search history.

(56) References Cited

U.S. PATENT DOCUMENTS

| | | |
|---|---|---|
| 2008/0046943 A1 | 2/2008 | Colsey et al. |
| 2009/0265422 A1 | 10/2009 | Park et al. |
| 2011/0072081 A1 | 3/2011 | Fang et al. |
| 2011/0179106 A1 | 7/2011 | Hulse et al. |

(Continued)

OTHER PUBLICATIONS

Extended Search Report for European Application No. 14863071.8 dated Sep. 27, 2016.

(Continued)

*Primary Examiner* — Glenford Madamba
(74) *Attorney, Agent, or Firm* — Harness, Dickey & Pierce, P.L.C.

(57) ABSTRACT

Provided is a method and system for providing cloud based user interface (UIs) that may store video content and a UI resource in a storage separate from a server, and may control the video content and the UI resource to be synthesized at a subscriber terminal device, thereby significantly decreasing load of a UIs providing server. The method and system for providing cloud based UIs may provide consistent UIs to various set-top boxes and media devices and may easily perform a change and a test of UIs.

11 Claims, 5 Drawing Sheets

(56) References Cited

U.S. PATENT DOCUMENTS

| | | | |
|---|---|---|---|
| 2011/0296460 A1* | 12/2011 | Jin | H04N 21/2393 |
| | | | 725/37 |
| 2012/0030706 A1 | 2/2012 | Hulse et al. | |
| 2013/0091525 A1 | 4/2013 | Yoon et al. | |
| 2016/0134910 A1* | 5/2016 | Davis | H04N 5/76 |
| | | | 725/27 |

OTHER PUBLICATIONS

Alexandra Mikityuk et al., "The Virtual Set-Top Box: On the Shift of IPTV Service Execution, Service & UI Composition into the Cloud," 2013 17th International Conference on Intelligence in Next Generation Networks (ICIN), Jan. 1, 2013, pp. 1-8, XP055303822.

* cited by examiner

[FIG. 1]
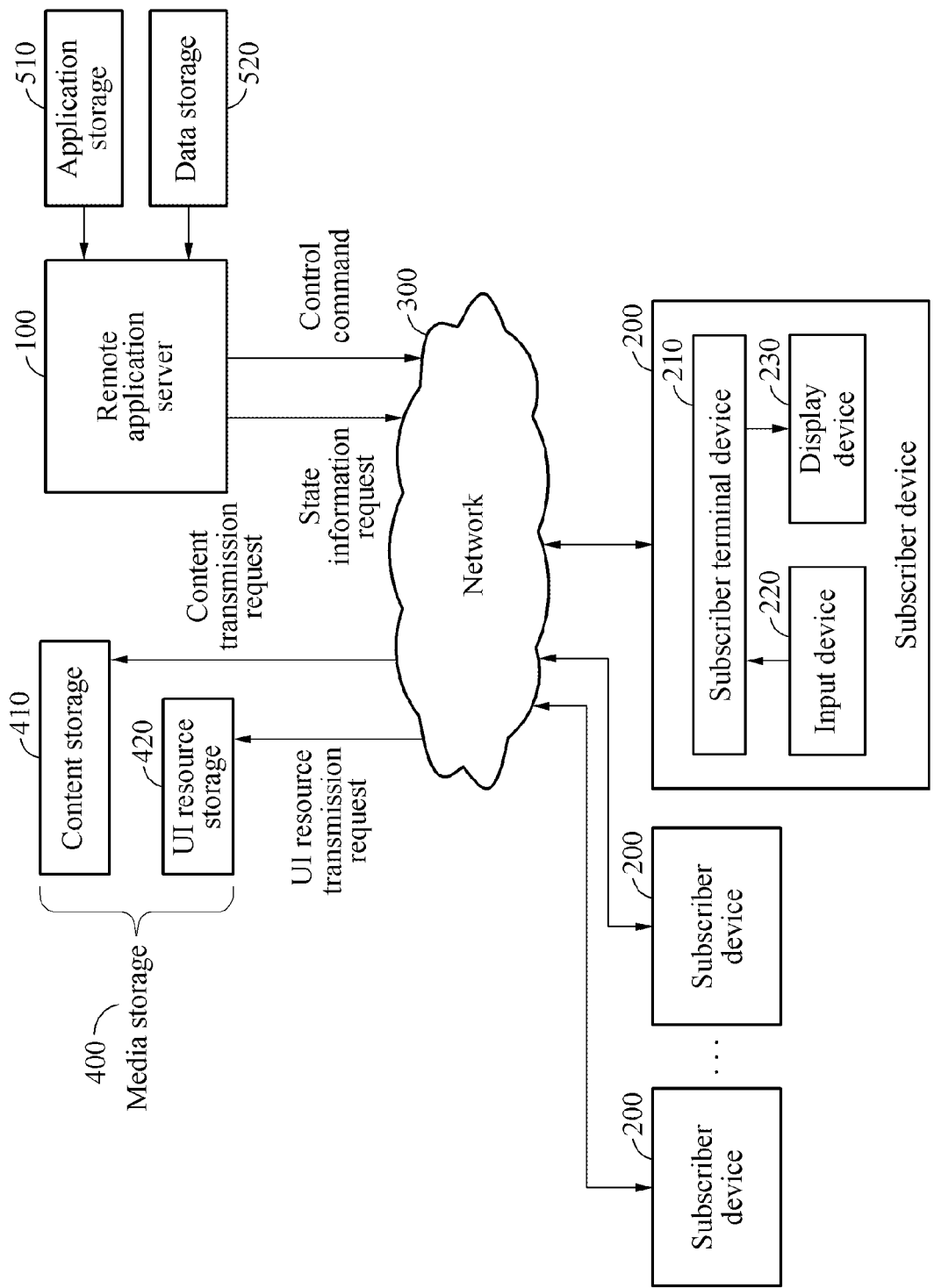

[FIG. 2]
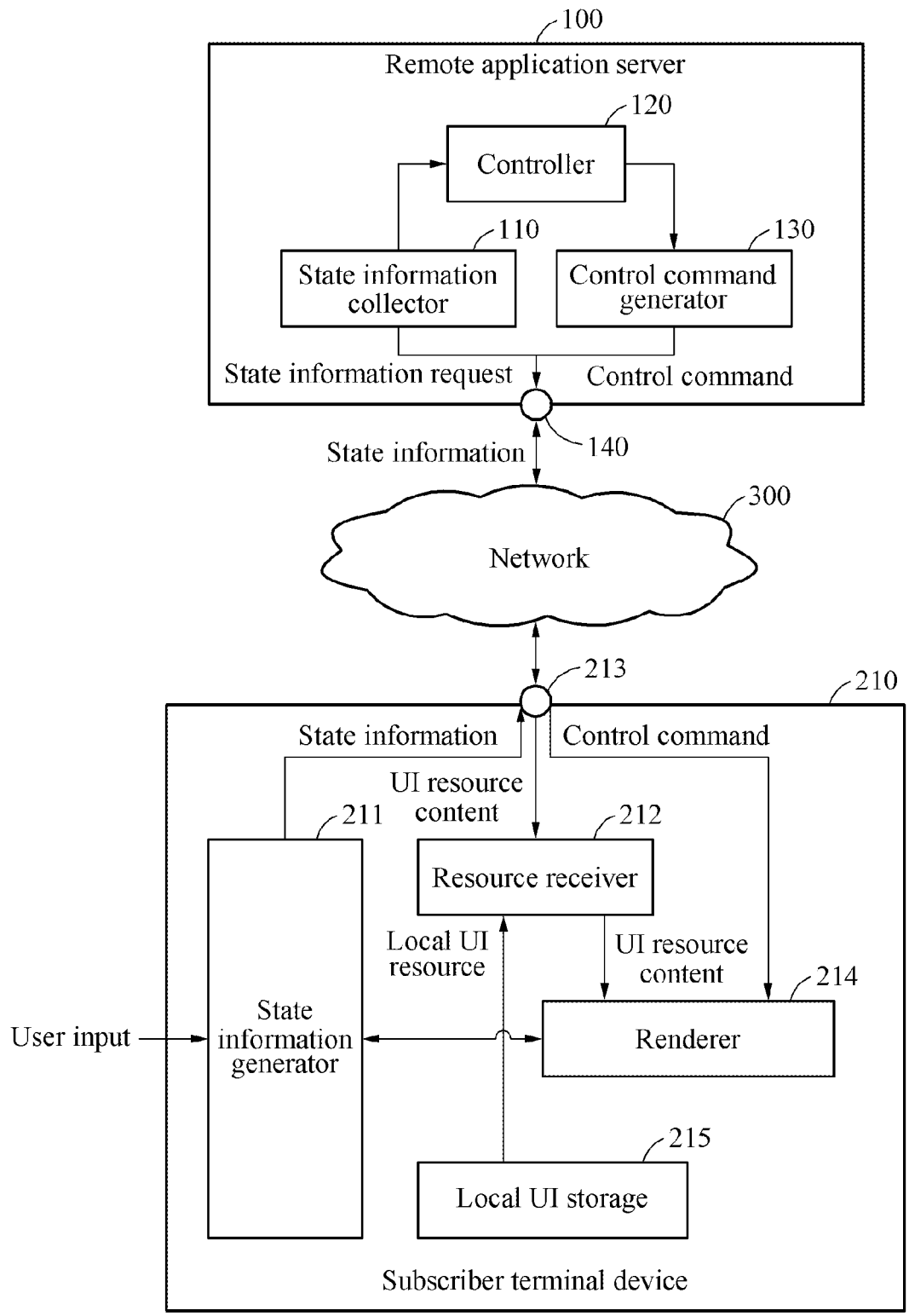

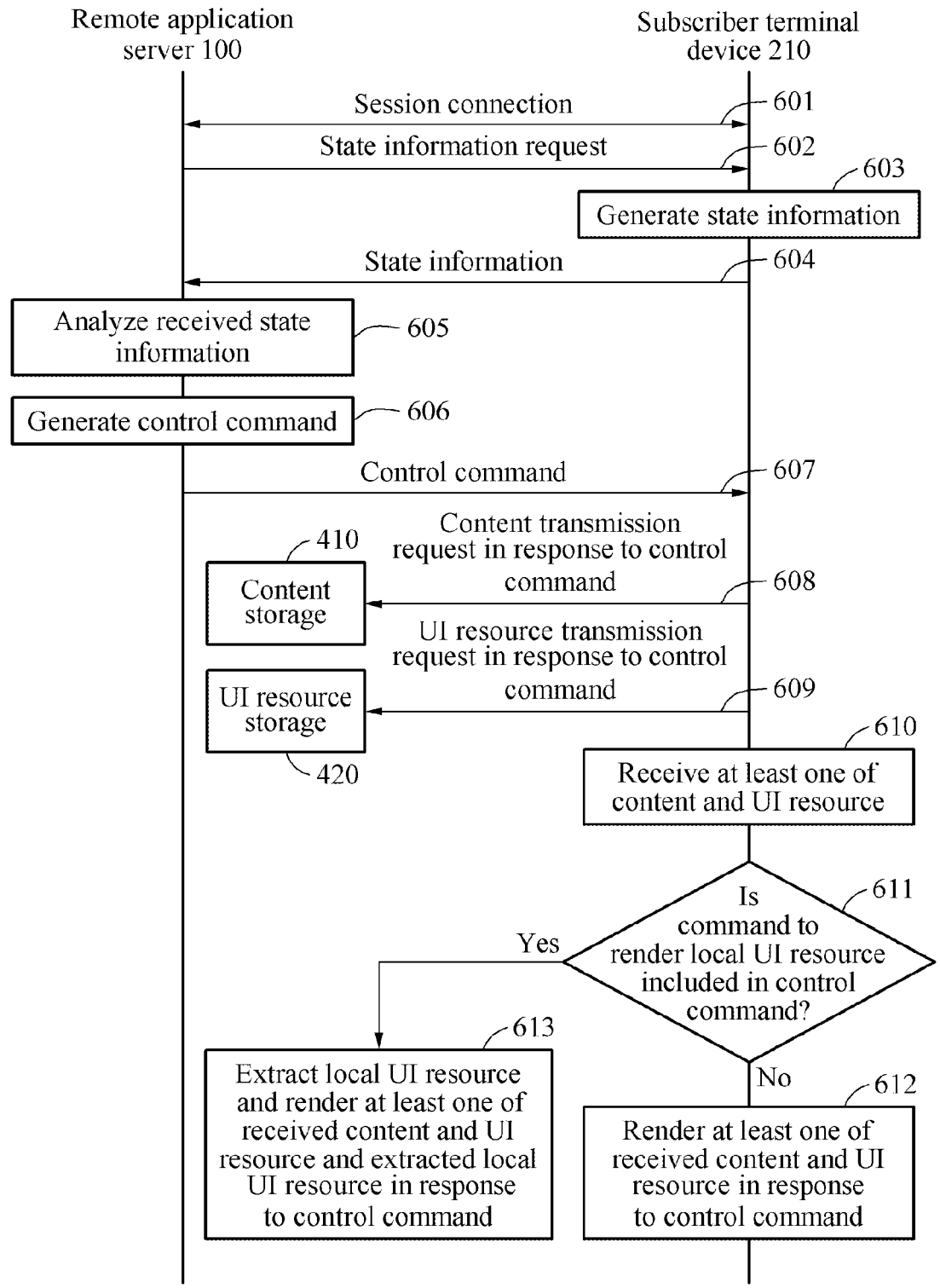

[FIG. 4]
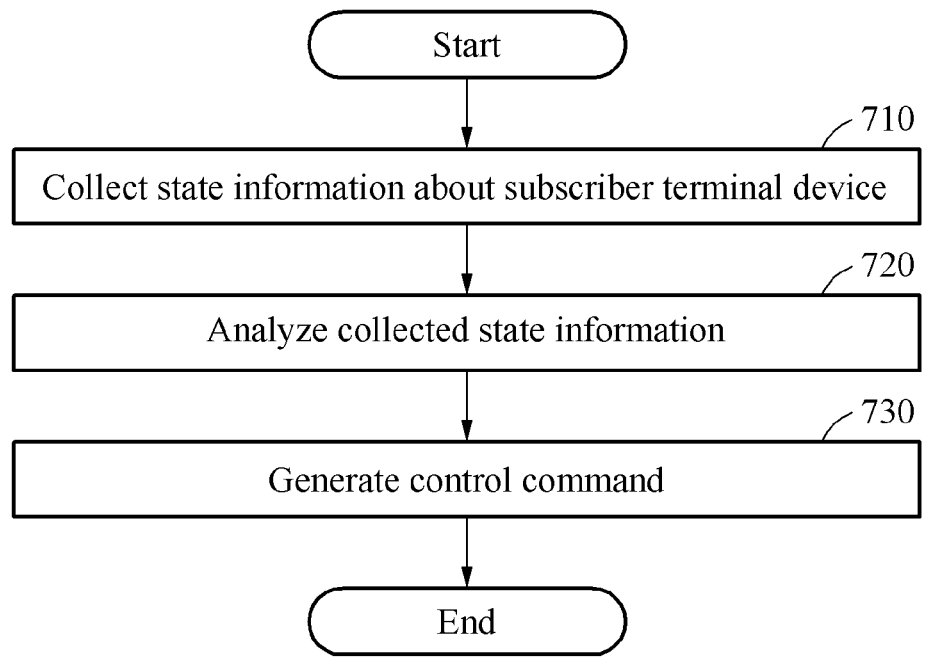

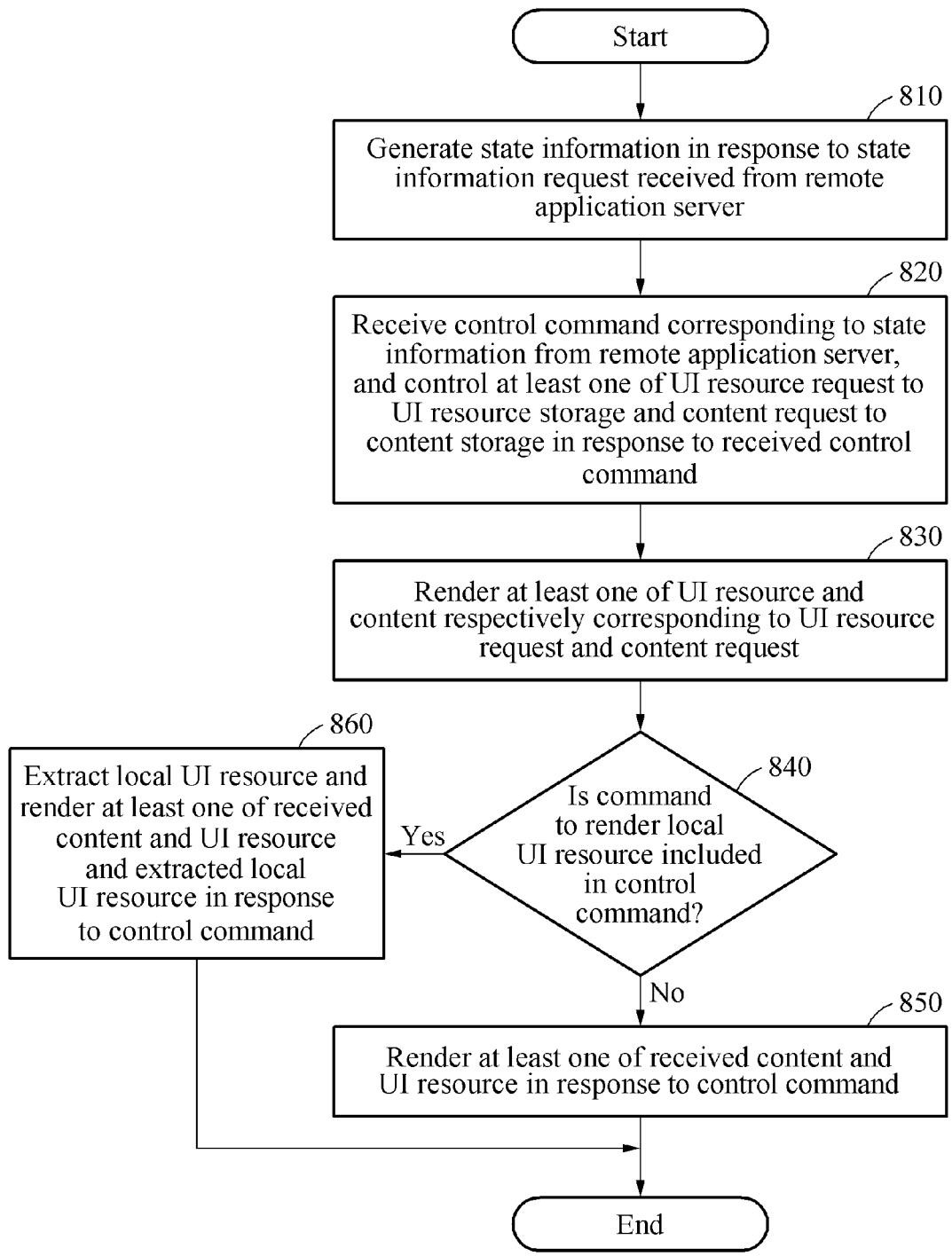
[FIG. 5]

SYSTEM AND METHOD FOR PROVIDING CLOUD BASED USER INTERFACES

CROSS-REFERENCE TO RELATED APPLICATIONS

This is a National Phase of PCT/KR2014/012679, filed on Dec. 23, 2014 and claims priority under 35 U.S.C. §119 to, Korean Application No. KR 10-2014-0161814 filed Nov. 19, 2014, the entire contents of each of which are incorporated by reference in their entirety.

TECHNICAL FIELD

The present invention relates to a system and method for providing cloud based user interfaces (UIs) that enables a subscriber terminal device to receive content and a UI resource from a storage separate from a remote application server in response to a control command of the remote application server, and to render the content and the UI resource.

RELATED ART

A current broadcasting environment including the technology development trend and the business trend of pay broadcasting providers has been switched to be an Internet based broadcasting environment, or has been evolved to be partially combined with a hybrid form.

Also, with the appearance of various smart CE devices, a media consumption style has been diversified. With the appearance of newly developed technology such as Hypertext Mark-up Language (HTML) 5 technology or ultra high definition (UHD) technology, capital requirements such as a purchase of high performance set-top box (STB), a reorganization of user interface (UI)/user eXperience (UX), a development of a new service, and an upgrade of a head-end system, occur, which results in being a burden on pay broadcasting providers.

Pay broadcasting providers are making ceaseless efforts to develop a technology that satisfies a varying trend of the times in order to secure superiority in competition with existing pay broadcasting providers or new media providers such as an over-the-top (OTT) provider, a Google TV, and an Apple TV.

Accordingly, pay broadcasting providers replace existing set-top boxes with high performance models, additionally introduce an Internet based service, and add recommend, search, and personalization functions by analyzing various user requests. Also, the pay broadcasting providers make investments on photographing, an edition, an encoder, and network equipment to apply a multi-screen technology enabling media consumption in various devices and to provide a video of a UHD beyond a HD.

However, in replacing existing head end systems and set-top boxes provided through large investments at a time, the pay broadcasting providers are facing a difficult situation in terms of finance and time. That is, an existing broadcasting method uses a significantly large amount of cost and time to provide a real-time broadcasting and a video on demand (VOD) and other bi-directional services and requires great cost burden in developing a service capable of satisfying a customer demand.

Accordingly, on the rise was a need for a technology that may outperform the aforementioned issues faced by pay broadcasting providers, may deviate from a technical method of an existing uni-directional broadcasting environment, may maximally use an advantage of a bi-directional broadcasting environment, and may provide consistent UI/UX to various set-top boxes and media devices. In addition, required is a technology for providing an Internet based service, for example, social, recommend, search, and personalization services, and easily performing a test and a change of UI/UX complex for each set-top box model.

Due to the above necessity, technologies for providing UIs from a cloud based server to a subscriber device have emerged. However, due to a characteristic of a computing process of the cloud based server, issues, such as an increase in a bandwidth for processing a process of a server and an increase in load of the server, have occurred.

In addition, when a session connection is not smooth due to a communication failure between a cloud based server and a subscriber device, a seamless service may not be provided to a user.

PRIOR ART

Patent Document

U.S. Patent Laid-Open Publication No. 2011/0296460 (2011.12.01), "METHOD AND APPARATUS FOR PROVIDING REMOTE USER INTERFACE (UI) SERVICE"

U.S. Patent Laid-Open Publication No. 2013/0091525 (2013.04.11), "METHOD AND APPARATUS FOR PROVIDING CLOUD-BASED USER MENU"

DESCRIPTION OF INVENTION

Subjects

The present invention provides a system and method for providing cloud based user interfaces (UIs) that enables a subscriber terminal device to receive content and a UI resource from a storage separate from a remote application server in response to a control command of the remote application server and to render the content and the UI resource, thereby reducing development cost of an application directly connected to introduction of a new service or service experience of a customer.

Also, the present invention provides a system and method for providing cloud based UIs in which a remote application server may not perform a process of acquiring content and a UI resource and combining the acquired content and UI resource, thereby significantly reducing load of the remote application server.

Also, the present invention provides a system and method for providing cloud based UIs that may provide consistent UIs to a subscriber device without performing an application development, porting, and a test with respect to different types of set-top boxes having different specifications, thereby achieving a quick service release and enhancing a customer satisfaction.

Also, the present invention provides a system and method for providing cloud based UIs that may provide a UI configurable even in a low performance subscriber terminal device, thereby reducing purchase cost of a subscriber terminal device and service development cost.

Solutions

A remote application server according to an embodiment of the present invention includes: a state information collector configured to collect state information about a subscriber terminal device; a control command generator configured to generate a control command including at least one of a rendering control command for controlling a rendering at the subscriber terminal device with respect to at least one of content and a user interface (UI) resource and a terminal control command for controlling the subscriber terminal device, based on the collected state information; and a controller configured to analyze the state information received from the state information collector, to transfer the analyzed state information to the control command generator, and to control a generation of the control command.

The subscriber terminal device may be configured to receive the rendering control command from the command generator over a network, and to request a media storage storing the content and the UI resource to transmit at least one of the content and the UI resource in response to the received rendering control command.

The subscriber terminal device may be configured to extract a local UI resource from a local UI storage within the subscriber terminal device in response to the received rendering control command, and to render at least one of the content and the UI resource and the extracted local UI resource.

The subscriber terminal device may be configured to receive the terminal control command from the command generator over a network, and to perform at least one of a terminal initialization, a software upgrade, and a session connection and a session block in response to the received terminal control command.

The state information may include at least one of resolution information of a display device interacting with the subscriber terminal device, display screen rotation information, device information of an input device interacting with the subscriber terminal device, and service subscription information. The subscriber terminal device may be configured to generate the state information and to transmit the generated state information to the state collector in response to a state information request received from the state information collector.

A subscriber terminal device according to an embodiment of the present invention includes: a state information generator configured to generate state information in response to a state information request received from a remote application server; a resource receiver configured to request a media storage for at least one of a UI resource and content, and to receive at least one of the UI resource and the content in response to the request; and a renderer configured to control a request to the media storage in response to a control command received from the remote application server, and to receive and render at least one of the content and the UI resource from the resource receiver.

The subscriber terminal device may further include a local UI storage configured to store and manage a local UI resource. The resource receiver may be configured to receive the local UI resource from the local UI storage and to transfer the received local UI resource to the renderer.

The renderer may be configured to control the local UI resource to be extracted from the local UI storage in response to the control command, and to render at least one of the received content and the received UI resource and the extracted local UI resource.

The state information generator may be configured to generate the state information corresponding to a user input received through an input device.

A method of providing cloud based UIs according to an embodiment of the present invention includes: collecting state information about a subscriber terminal device; analyzing the collected state information; and generating a control command including at least one of a rendering control command for controlling a rendering at the subscriber terminal device with respect to at least one of content and a UI resource and a terminal control command for controlling the subscriber terminal device, based on the collected state information.

A method of providing cloud based UIs according to another embodiment of the present invention includes: generating state information in response to a state information request received from a remote application server; receiving a control command corresponding to the state information from the remote application server, and controlling a request to a media storage for at least one of a UI resource and content in response to the received control command; and rendering at least one of the content and the UI resource associated with the request.

Effects of the Invention

According to embodiments of the present invention, a subscriber terminal device may receive content and a UI resource from a storage separate from a remote application server in response to a control command of the remote application server and may render the content and the UI resource, thereby reducing development cost of an application directly connected to introduction of a new service or service experience of a customer.

Also, according to embodiments of the present invention, a remote application server may not perform a process of acquiring content and a UI resource and combining the acquired content and UI resource, thereby significantly reducing load of the remote application server.

Also, according to embodiments of the present invention, it is possible to provide consistent UIs to a subscriber device without performing an application development, porting, and a test with respect to different types of set-top boxes having different specifications, thereby achieving a quick service release and enhancing a customer satisfaction.

Also, according to embodiments of the present invention, it is possible to provide a UI configurable even in a low performance subscriber terminal device, thereby reducing purchase cost of a subscriber terminal device and service development cost.

BRIEF DESCRIPTION OF THE DRAWINGS

FIG. 1 is a block diagram illustrating a system for providing cloud based user interfaces (UIs) according to an embodiment of the present invention.

FIG. 2 is a block diagram illustrating a configuration of a remote application server and a subscriber terminal device of a system for providing cloud based UIs according to an embodiment of the present invention.

FIG. 3 is a flowchart illustrating a process of providing cloud based UIs through a control command between a remote application server and a subscriber terminal device according to an embodiment of the present invention.

FIG. 4 is a flowchart illustrating a process of providing cloud based UIs through a remote application server in a system for providing cloud based UIs according to an embodiment of the present invention.

FIG. 5 is a flowchart illustrating a process of providing cloud based UIs through a subscriber terminal device of a system for providing cloud based UIs according to an embodiment of the present invention.

DETAILED DESCRIPTION TO CARRY OUT THE INVENTION

Hereinafter, embodiments of the present invention will be described in detail with reference to the accompanying drawings and contents described therein, however, the present invention is not limited thereto or restricted thereby.

The terminology used in the present specification is to explain the embodiments and is not to limit the present invention. In the present specification, unless particularly described in the sentence, a singular form may also include a plural form. The term "comprises/includes" and/or "comprising/including" used herein does not exclude the presence or addition of at least one another constituent element, step, operation, and/or device with respect to the described constituent element, step, operation, and/or device.

The terms "embodiment", "example", "feature", "instance", and the like used herein should not be interpreted as that a described predetermined aspect or design is excellent or advantageous compared to other aspects or designs.

Also, the term "or" indicates "inclusive or" rather than "exclusive or". That is, unless differently described or unless clearly described in the context, the expression that "x uses a or b" indicates any one of natural inclusive permutations.

Also, a singular expression "a" or "an" used in the present specification and the claims should be interpreted to generally indicate "at least one" unless described otherwise or unless clearly described as a singular form in the context.

Also, the terms "first", "second", and the like used in the present specification and the claims may be used to describe various constituent elements. However, the constituent elements should not be limited by the terms. The terms may be used to distinguish one constituent element from another constituent element.

Unless differently defined, all the terminologies used in the present specification, including technical and scientific terms, may be used as meanings that may be commonly understood by those skilled in the art. Also, the terms defined in a generally used dictionary should not be idealistically or excessively interpreted unless particularly clearly defined.

When it is determined detailed description related to a related known function or configuration they may make the purpose of the present invention unnecessarily ambiguous in describing the present invention, the detailed description will be omitted here. Also, terminologies used herein are defined to appropriately describe the embodiments of the present invention and thus may be changed depending on a user, the intent of an operator, or a custom. Accordingly, the terminologies must be defined based on the following overall description of this specification.

FIG. 1 is a block diagram illustrating a system for providing cloud based user interfaces (UIs) according to an embodiment of the present invention.

Referring to FIG. 1, the system for providing cloud based UIs according to an embodiment of the present invention includes a remote application server 100 and a subscriber device 200.

The remote application server 100 analyzes state information of a subscriber terminal device 210, generates a control command based on the analyzed state information, transmits the control command to the subscriber device 200, and controls the subscriber terminal device 210 or controls a rendering at the subscriber terminal device 210 with respect to at least one of content and a UI resource in response to the control command.

In detail, the remote application server 100 collects the state information of the subscriber terminal device 210 within the subscriber device 200 over a network 300, and generates a control command for controlling a rendering at the subscriber terminal device 210 with respect to at least one of the content and the UI resource based on the collected state information.

Also, the remote application server 100 may also generate a control command for controlling the subscriber terminal device 210 itself.

The remote application server 100 transmits the generated control command to the subscriber device 200 over the network 300.

The state information according to an embodiment of the present invention may be information associated with the subscriber terminal device 210 when the subscriber terminal device 210 performs a predetermined function in response to the control command received from the remote application server 100.

For example, the state information may include at least one of resolution information of a display device 230 interacting with the subscriber terminal device 210, display screen rotation information, device information such as an input device 220 interacting with the subscriber terminal device 210, and service subscription information.

The state information may be generated from the subscriber terminal device 210 together with session connection information in response to a session connection between the remote application server 100 and the subscriber terminal device 210, and may be transmitted to the remote application server 100. Also, the state information may be generated from the subscriber terminal device 210 in response to a user input and may also be transmitted to the remote application server 100.

The remote application server 100 of the present invention may be a head end system or a cloud based media providing server, and may receive an application for providing a service from an application storage 510 and may also receive data such as subscriber information, media information, and social network related information from a data storage 520.

The subscriber terminal device 210 within the subscriber device 200 performs a function of the subscriber terminal device 210 itself or receives at least one of content and a UI resource from a content storage 410 and a UI resource storage 420 separate from the remote application server 100 over the network 300 and renders the received at least one of content and the UI resource, in response to the received control command.

The subscriber terminal device 210 receives the control command from the remote application server 100, and requests a media storage 400 to transmit media such as the content and the UI resource in response to the received control command. The media storage 400 may include the content storage 410 and the UI resource 420 based on a type or a form of stored media.

In detail, in response to the received control command, the subscriber terminal device 210 requests the content storage 410 to transmit content and receives the content from the content storage 410, and requests the UI resource storage 420 to transmit the UI resource and receives the UI resource from the UI resource storage 420.

In response to the control command received from the remote application server 100, the subscriber terminal device 210 renders at least one of the received content and UI resource.

Depending on embodiments, in response to the control command, the subscriber device 200 may request or receive content through a content channel formed with the content storage 410, and may request or receive a UI resource through a UI resource channel formed with the UI resource storage 420.

The UI resource may be configured using at least one of a webpage, a bitmap of an application, and a graphic primitive of the application.

Depending on embodiments, the UI resource may include a user interface for receiving an external user command to control a provider service and the subscriber device 200.

The subscriber device 200 may include the subscriber terminal device 210, the input device 220, and the display device 230. As illustrated in FIG. 1, at least one subscriber devices 200 may be provided.

The subscriber terminal device 210 of the present invention may be an electronic device equipped with a wired/wireless communication module such as a set-top terminal (STT), a set-top box (STB), a communication terminal, a personal computer (PC) a mobile communication terminal, a smartphone, a note pad, a personal digital assistant (PDA), and a tablet PC. Further, the subscriber terminal device 210 may be a terminal device capable of connecting to and thereby communicating with at least one of the remote application server 100, the content storage 40, and the UI resource storage 420 over the network 300.

Depending on embodiments, the subscriber terminal device 210 may also be a terminal device capable of performing signal processing, a bandwidth control process, and a graphics processing process.

In detail, the subscriber terminal device 210 may be a terminal device that performs a graphics processing process such as receiving and decoding MPEG-2 transport stream about content including video content and audio content, and rendering the decoded content.

Also, the subscriber terminal device 210 may render a local UI resource that is stored and thereby maintained in the subscriber terminal device 210, and received media, for example, the received UI resource and content, and may provide a user with a function such as an electronic program guide (EPG), a video on demand (VOD), and a digital video recorder (DVR).

The input device 220 may be a device capable of receiving an input from the user, such as a remote controller, a keyboard, and a touch screen device.

The subscriber terminal device 210 may receive an interactive user input based on bi-directionality about the content and the UI resource rendered and provided from the input device 220 through the display device 230.

For example, the user input may include various signals such as a stream request, a session initialization, and a clickstream.

Depending on embodiments, the subscriber terminal device 210 may also directly render a resource corresponding to a user input, without depending on a control command from the remote application server 100 based on a type of the user input received through the input device 220.

For example, when the user input is reprocessed to be suitable for a current resource state provided to the user, a transmission of state information to the remote application server 100 may not be required during a resource reprocessing process. That is, the subscriber terminal device 210 may also directly process the resource in response to the user input received through the input device 220.

The display device 230 may be a device that provides the user with content and the UI resource through a visual sense and an auditory sense, such s a TV, a computer monitor, a communication monitor, and a smartphone display.

The content storage 410 may store and maintain content, such as video content, audio content, a real-time TV broadcasting program, a program on demand, social networking service (SNS) information, a chat message, a product, and an application.

Depending on embodiments, the content storage 410 may also store content of a format corresponding to a predetermined protocol such as an MPEG-2 transport packet, an MPEG-4, and a digital video broadcasting (DVB), or content to which a predetermined protocol is not applied.

As another example, the content storage 410 may also store content divided using a predetermined method.

When content is real-time broadcasting content, the remote application server 100 may control the content storage 410 to acquire broadcasting content, to divide the acquired broadcasting content using a predetermined method, and to store the divided broadcasting content. In this case, the content storage 410 may separately store and manage broadcasting program guide information to acquire and store the broadcasting content.

For example, when the remote application server 100 analyzes state information of the subscriber terminal device 210 and the analyzed state information indicates a reception standby state of divided and thereby stored broadcasting content, the remote application server 100 generates a control command for a transmission of divided and thereby stored broadcasting content and transmits the control command to the subscriber terminal device 210.

The subscriber terminal device 210 receives the control command, and in response thereto, transmits a request for transmitting broadcasting content to the content storage 410. The content storage 410 may search for additional data of divided content, may extract at least one divided content suitable for the received request, may synthesize the same, may process the same as user content, and may transmit the processed user content to the subscriber terminal device 210.

Here, the content storage 410 may transmit corresponding content to the subscriber terminal device 210 or another client device (not shown) using a download method or a streaming method.

Also, the content storage 410 may store at least one of broadcasting content, divided content, and user content in a cloud storage space, and may seamlessly provide content so that content may be continuously played back between a plurality of client devices held by the user, which may be referred to as an N-screen service.

To this end, one of the remote application server 100 and the content storage 410 may separately store and manage a content playback history for each client device.

According to another embodiment, the remote application server 100 may also control the content storage 410 and the UI resource storage 420 to transmit corresponding different content and a UI resource to each of at least one subscriber device 200 based on a variety of communication protocols.

That is, each of a first subscriber device and a second subscriber device may receive content and a UI resource using a different protocol method.

FIG. 2 is a block diagram illustrating a configuration of a remote application server and a subscriber terminal device of a system for providing cloud based Us according to an embodiment of the present invention.

The remote application server 100 according to an embodiment of the present invention may analyze state information of the subscriber terminal device 210, may generate a control command based on the analyzed state information, may transmit the generated control command to the subscriber terminal device 210, and may control the subscriber terminal device 210 or may control a rendering at the subscriber terminal device 210 with respect to at least one of content and a UI resource in response to the control command.

To this end, the remote application server 100 includes a state information collector 110, a control command generator 130, and a controller 120.

The state information collector 110 collects state information about the subscriber terminal device 210.

The state information collector 110 transmits a state information request signal to the subscriber terminal device 210 over the network 300 to collect state information of the subscriber terminal device 210, and receives state information from the subscriber terminal device 210 corresponding to the transmitted state information request signal.

The state information may be information associated with the subscriber terminal device 210 when the subscriber terminal device 210 performs a predetermined function in response to the control command received from the remote application server 100.

For example, the state information may include at least one of resolution information of the display device 230 of FIG. 1 interacting with the subscriber terminal device 210, display screen rotation information, device information such as the input device 220 of FIG. 1 interacting with the subscriber terminal device 210, and service subscription information.

The state information may be generated from the subscriber terminal device 210 together with session connection information in response to a session connection between the remote application server 100 and the subscriber terminal device 210 and may be transmitted to the remote application server 100. The state information may be generated from the subscriber terminal device 210 in response to a user input and may be transmitted to the remote application server 100.

Also, the state information may be information corresponding to the user input received through an input device.

The control command generator 130 generates a control command including at least one of a rendering control command for controlling a rendering at the subscriber terminal device 210 with respect to at least one of content and a UI resource and a terminal control command for controlling the subscriber terminal device 210, based on the collected state information.

Also, the control command generator 130 transmits the generated control command to the subscriber terminal device 210.

Also, depending on embodiments, the control command generator 130 may also generate a control command including an image required for rendering at the subscriber terminal device 210.

The controller 120 may analyze state information received from the state information collector 110, may transfer the analyzed state information to the control command generator 130, or may control a generation of the control command.

Also, the remote application server 100 according to an embodiment of the present invention may further include a transport module 140 configured to form a signal path with the subscriber terminal device 210 associated with a state information request, a reception of state information, and a transmission of the control command. The signal path may form a single path with a transport module 213 of the subscriber terminal device 210.

The remote application server 100 may efficiently control the subscriber terminal device 210 through the signal path of the transport module 140.

For example, the remote application server 100 may efficiently control a local application installed in the subscriber terminal device 210 and an authentication with the subscriber terminal device 210 through the transport module 140.

In response to the control command received from the control command generator 130, the subscriber terminal device 210 according to an embodiment of the present invention performs a function of the subscriber terminal device 210 itself or receives at least one of content and a UI resource from a media storage separate from the remote application server 100 over the network 300 and renders the received at least one of content and the UI resource.

The media storage may include a content storage and a UI resource storage based on a type or a form of stored media.

In detail, in response to the received control command, the subscriber terminal device 210 requests the content storage to transmit content and receives the content from the content storage, and requests the UI resource storage to transmit the UI resource and receives the UI resource from the UI resource storage.

In response to the control command received from the control command generator 130, the subscriber terminal device 210 renders at least one of the content and the UI resource received from the media storage.

To this end, the subscriber terminal device 210 according to an embodiment of the present invention includes a state information generator 211, a UI resource receiver 212, a content receiver 213, and a renderer 214.

The state information generator 211 generates state information in response to a state information request received from the remote application server 100.

The state information may include information about a standby state of a control command from the remote application server 100, such as a content reception standby state and a state requiring processing of a user input.

The resource receiver 212 requests the media storage for at least one of the UI resource and content, and receives at least one of the UI resource and the content in response to the request.

The UI resource may be configured using at least one of a webpage, a bitmap of an application, and a graphics primitive of the application.

Depending on embodiments, the UI resource may include a user interface for receiving an external user command for controlling a provider service and the subscriber terminal device 210.

In response to a UI command received from the control command generator 130, the renderer 214 controls a request to the media storage, and receives and renders at least one of the content and the UI resource from the resource receiver 212.

The media storage including a content storage may store and maintain content, such as video content, audio content, a real-time TV broadcasting program, a program on demand, SNS information, a chat message, a product, and an application.

Depending on embodiments, the media storage may also store content of a format corresponding to a predetermined protocol such as an MPEG-2 transport packet, an MPEG-4, and a DVB, or content to which a predetermined protocol is not applied.

As another example, the media storage may also store content divided using a predetermined method. When content is real-time broadcasting content, the content storage may acquire broadcasting content, may divide the acquired broadcasting content using a predetermined method, and may store the divided broadcasting content.

In this case, the content storage may separate store and manage broadcasting program guide information to acquire and store the broadcasting content.

The state information collector 110 of the remote application server 100 receives state information from the state information generator 211. When the analyzed state information indicates a reception standby state of divided and thereby stored broadcasting content as a result of analyzing the received state information by the state information analyzer 120, the control command generator 130 generates a control command for a transmission request of the divided and thereby stored broadcasting content and transmits the generated control command to the renderer 214.

The renderer 214 receives the control command and transmits a request for transmitting broadcasting content to the content storage in response to the received control command. The content storage may search for additional data of divided content, may extract at least one divided content suitable for the received request, may synthesize the same, may process the same as user content, and may transmit the processed user content to the renderer 214.

Here, the media storage may transmit the corresponding content to the subscriber terminal device 210 or another client device (not shown) using a download method or a streaming method.

Also, the content storage may store at least one of broadcasting content, divided content, and user content in a cloud storage space, and may seamlessly provide content so that content may be continuously played back between a plurality of client devices held by the user, which may be referred to as an N-screen service.

To this end, the remote application server 100 may separately store and manage a content playback history for each client device.

The subscriber terminal device 210 according to an embodiment of the present invention may further include a local UI storage 215 configured to store and maintain a local UI resource.

When the renderer 214 receives a control command for rendering a local UI resource from the control command generator 130, the renderer 214 may render a least one of the content and the UI resource and the local UI resource in response to the UI command received from the control command generator 130.

In more detail, the resource receiver 212 may receive the local UI resource from the local UI storage 215 and may transfer the received local UI resource to the renderer 214. The renderer 214 may control the local UI resource to be extracted from the local UI storage 215 and may render at least one media of the local UI resource, the received resource, and the content, in response to the control command.

The local UI resource may be a user interface frequently interacting with the user and requiring a quick responsiveness. For example, the local UI resource may be a UI resource corresponding to an EPG. The EPG may display schedules of a broadcasting program on a display screen. A user, for example, a viewer may select a desired program through the EPG, or may search for a desired program through a standard such as a time, a title, a channel, and a genre, using the subscriber terminal 200.

On the contrary, the UI resource stored and maintained in the UI resource storage may be a user interface that is infrequently used by the user or is beyond the performance of the subscriber terminal device 210.

Depending on embodiments, the renderer 214 may also directly render a resource corresponding to a user input, without depending on a control command from the remote application server 100 based on a type of the user input received through an interaction with the state information generator 211.

For example, when the user input is reprocessed to be suitable for a current resource state provided to the user, a transmission of state information to the remote application server 100 may not be required during a resource reprocessing process. That is, the renderer 214 may also directly process the resource in response to the user input through an interaction with the state information generator 211.

Also, the subscriber terminal device 210 may further include the transport module 213 configured to form a signal path with the remote application server 100 associated with the control command and resources including a session access, state information, a UI resource, and content. The signal path may be a single path.

The remote application server 100 may efficiently control the subscriber terminal device 210 through the signal path of the transport module 213.

In more detail, the remote application server 100 may more efficiently control a local application installed in the subscriber terminal device 210, and may easily provide an addition and a change of a service to the subscriber terminal device 210 through the transport module 213.

FIG. 3 is a flowchart illustrating a process of providing cloud based UIs through a control command between a remote application server and a subscriber terminal device according to an embodiment of the present invention.

Referring to FIG. 3, in operation 601, a session is connected between the remote application server 100 and the subscriber terminal device 210. The session connection between the remote application server 100 and the subscriber terminal device 210 may be performed by transmitting a session connection request from the subscriber terminal device 210 to the remote application server 100.

In operation 602, the remote application server 100 requests the subscriber terminal device 210 for state information.

The state information may be information associated with the subscriber terminal device 210 when the subscriber terminal device 210 performs a predetermined function in response to the control command received from the remote application server 100.

For example, the state information may include at least one of resolution information of a display device interacting with the subscriber terminal device 210, display screen rotation information, device information such as an input device interacting with the subscriber terminal device 210, and service subscription information.

Depending on embodiments, operation 602 may be performed by transmitting a session access request and state information from the subscriber terminal device 210 to the remote application server 100 together with the session connection between the remote application server 100 and the subscriber terminal device 210 in operation 601.

In operation 603, the subscriber terminal device 210 generates state information in response to the state information request. In operation 604, the subscriber terminal device 210 transmits the generated state information to the remote application server 100.

In operation 605, the remote application server 100 analyzes the received state information. In operation 606, the remote application server 100 generates a control command including at least one of a rendering control command for controlling a rendering at the subscriber terminal device 210 with respect to at least one of content and a UI resource and a terminal control command for controlling the subscriber terminal device 210, based on the analyzed state information.

In operation 607, the remote application server 100 transmits the generated control command to the subscriber terminal device 210.

The subscriber terminal device 210 controls at least one of a request to the UI resource storage 420 for a UI resource and a request to the content storage 410 for content, in response to the control command received from the remote application server 100.

In detail, in operation 608, the remote application server 100 requests the content storage 410 to transmit the content in response to the control command received from the remote application server 100.

The content may include video content, audio content, a real-time TV broadcasting program, a program on demand, SNS information, a chat message, a product, and an application.

Depending on embodiments, the content may include a format corresponding to a predetermined protocol such as an MPEG-2 transport packet, an MPEG-4, and a DVB According to another embodiment, content may be content divided using a predetermined method. For example, when the content is real-time broadcasting content, the content storage 410 may acquire broadcasting content, may divide the acquired broadcasting content using a predetermined method, and may store the divided broadcasting content.

In operation 609, the subscriber terminal device 210 requests the UI resource storage 420 to transmit the UI resource in response to the control command received from the remote application server 100.

The UI resource may be configured using at least one of a webpage, a bitmap of an application, and a graphic primitive of the application.

Depending on embodiments, the UI resource may provide a user interface for receiving an external user command to control a provider service and the subscriber terminal device 210.

The subscriber terminal device 210 receives at least one of the content and the UI resource in operation 610, and determines whether a command to render the local UI resource is included in the control command received from the remote application server in operation 611.

When the command to render the local UI resource is not included in the control command received from the remote application server 100 in operation 611, the subscriber terminal device 210 renders at least one of the UI resource and the content respectively corresponding to the UI resource request and the content request in operation 612.

Conversely, when the command to render the local UI resource is included in the control command received from the remote application server 100 in operation 611, the subscriber terminal device 210 renders at least one of the UI resource and the content respectively corresponding to the UI resource request and the content request and the local UI resource extracted from a local UI storage in operation 613.

The local UI resource may be a user interface frequently interacting with the user and requiring a quick responsiveness. For example, the local UI resource may be a UI resource corresponding to an EPG. The EPG may display schedules of a broadcasting program on a display screen. A user, for example, a viewer may select a desired program through the EPG, or may search for a desired program through a standard such as a time, a title, a channel, and a genre, using the subscriber device 200.

On the contrary, the UI resource stored and maintained in the UI resource storage may be a user interface that is infrequently used by the user or is beyond the performance of the subscriber terminal device 210.

FIG. 4 is a flowchart illustrating a process of providing cloud based UIs through a remote application server in a system for providing cloud based UIs according to an embodiment of the present invention.

Referring to FIG. 4, in operation 710, the remote application server collects state information about a subscriber terminal device.

Operation 710 may include an operation in which the remote application server connects a session with the subscriber terminal device. The session connection may be performed by transmitting a session connection request from the subscriber terminal device to the remote application server.

In operation 720, the remote application server analyzes the collected state information.

For example, operation 720 may be an operation of analyzing information for performing a function of the subscriber terminal device such as a reception of content and a UI resource and processing of a user input.

In operation 730, the remote application server generates a control command based on the analyzed state information.

Operation 730 may be an operation of controlling a control command including a rendering control command for controlling a rendering at the subscriber terminal device with respect to at least one of the content and the UI resource based on the analyzed state information.

Depending on embodiments, operation 730 may be an operation of generating a control command including a terminal control command for controlling the subscriber terminal device.

FIG. 5 is a flowchart illustrating a process of providing cloud based UIs through a subscriber terminal device of a system for providing cloud based UIs according to an embodiment of the present invention.

Referring to FIG. 5, in operation 810, the subscriber terminal device generates state information in response to a state information request received from a remote application server.

The state information may be information associated with the subscriber terminal device when the subscriber terminal device performs a predetermined function in response to a control command received from the remote application server.

In operation 820, the subscriber terminal device receives a control command corresponding to the state information from the remote application server, and controls at least one of a UI resource request to a UI resource storage and a content request to a content storage in response to the received control command.

The content may include video content, audio content, a real-time TV broadcasting program, a program on demand, SNS information, a chat message, a product, and an application.

Depending on embodiments, content may include a format corresponding to a predetermined protocol such as an MPEG-2 transport packet, an MPEG-4, and a DVB.

Also, according to another embodiment, the content may be content divided using a predetermined method. For example, when content is real-time broadcasting content, the content storage may acquire broadcasting content, may divide the acquired broadcasting content using a predetermined method, and may store the divided broadcasting content.

The UI resource may be configured using at least one of a webpage, a bitmap of an application, and a graphics primitive of the application.

Depending on embodiments, the UI resource may include a user interface for receiving an external user command for controlling a provider service and the subscriber terminal device.

In operation 830, the subscriber terminal device renders at least one of the UI resource and content respectively corresponding to the UI resource request and the content request received in operation 820.

In operation 840, the subscriber terminal device determines whether a command to render a local UI resource is included in the control command received from the remote application server.

When the command to render the local UI resource is not included in the control command received from the remote application server in operation 840, the subscriber terminal device renders at least one of the UI resource and the content respectively corresponding to the UI resource request and the content request in operation 850.

Conversely, when the command to render the local UI resource is included in the control command received from the remote application server in operation 840, the subscriber terminal device renders at least one of the UI resource and the content respectively corresponding to the UI resource request and the content request and the local UI resource extracted from the local UI storage in operation 860.

The local UI resource may be a user interface frequently interacting with the user and requiring a quick responsiveness. For example, the local UI resource may be a UI resource corresponding to an EPG. The EPG may display schedules of a broadcasting program on a display screen. A user, for example, a viewer may select a desired program through the EPG, or may search for a desired program through a standard such as a time, a title, a channel, and a genre, using the subscriber device.

On the contrary, the UI resource stored and maintained in the UI resource storage may be a user interface that is infrequently used by the user or is beyond the performance of the subscriber terminal device.

The above-described embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A remote application server comprising:
   a memory configured to store computer-readable instructions; and
   one or more processors configured to execute the computer-readable instructions such that the one or more processors are configured to,
     collect state information about a subscriber terminal device,
     analyze the state information received,
     generate a control command based on the analyzed state information, the control command including at least one of
       a rendering control command for controlling a rendering at the subscriber terminal device with respect to at least one of content and a user interface (UI) resource, and
       a terminal control command for controlling the subscriber terminal device, and
     transmit the rendering control command to control the subscriber terminal device to enable the subscriber terminal device to request a media storage for at least one of the content and the UI resource, the media storage being separate from the remote application server.

2. The remote application server of claim 1, wherein the one or more processors are further configured to transmit the rendering control command to the subscriber terminal device.

3. The remote application server of claim 2, wherein the one or more processors are further configured to transmit the rendering control command to the subscriber terminal device to enable the subscriber terminal device to extract a local UI resource from a local UI storage included in the subscriber terminal device in response to the rendering control command, and to render at least one of the content, and the UI resource, and the extracted local UI resource.

4. The remote application server of claim 1, wherein the one or more processors are configured to transmit the rendering control command to the subscriber terminal device over a network to enable the subscriber terminal device to perform at least one of a terminal initialization, a software upgrade, and a session connection, and a session block in response to the terminal control command.

5. The remote application server of claim 1, wherein
   the state information comprises at least one of resolution information of a display device interacting with the subscriber terminal device, display screen rotation information, device information of an input device interacting with the subscriber terminal device, and service subscription information; and
   the one or more processors are further configured to transmit a state information request to the subscriber terminal device, and receive the state information transmitted from the subscriber terminal device in response to the state information request.

6. A subscriber terminal device comprising:
   a memory configured to store computer-readable instructions; and
   one or more processors configured to execute the computer-readable instructions such that the one or more processors are configured to, generate state information in response to a state information request received from a remote application server or a state information provided by a user, send a request to a media storage for at least one of a user interface (UI) resource and content, and receive at least one of the UI resource and the content in response to the state information request, the media storage being separate from the remote application server, control the request to the media storage in response to a control command received from the remote application server, and receive and render at least one of the content and the UI resource.

7. The subscriber terminal device of claim 6, further comprising:

a local UI storage configured to store and manage a local UI resource, wherein the one or more processors are further configured to receive the local UI resource from the local UI storage, and render the received local UI resource.

8. The subscriber terminal device of claim 7, wherein the one or more processors are configured to extract the local UI resource from the local UI storage in response to the control command, and render the at least one of the received content, the received UI resource, and the extracted local UI resource.

9. A method of providing cloud based user interfaces (UIs) using a remote application server, the remote application server including a memory configured to store computer-readable instructions and one or more processors configured to execute the computer-readable instructions, the method comprising:

collecting, by the one or more processors, state information about a subscriber terminal device;

analyzing, by the one or more processors, the collected state information;

generating, by the one or more processors, a control command based on the collected state information, the control command including, at least one of a rendering control command for controlling a rendering at the subscriber terminal device with respect to at least one of content and a UI resource, and a terminal control command for controlling the subscriber terminal device; and transmitting, by the one or more processors, the rendering control command to control the subscriber terminal device to enable the subscriber terminal device to request a media storage for at least one of the content and the UI resource, the media storage being separate from the remote application server.

10. A method of providing cloud based user interfaces (UIs) associated with a subscriber terminal device, the subscriber terminal device including a memory configured to store computer-readable instructions and one or more processors configured to execute the computer-readable instructions, the method comprising:

generating, by the one or more processors, state information in response to a state information request received from a remote application server;

receiving, by the one or more processors, a control command corresponding to the state information from the remote application server;

controlling a request to a media storage for at least one of a UI resource and content in response to the received control command, the media storage being separate from the remote application server; and rendering at least one of the content and the UI resource associated with the request to the media storage.

11. A non-transitory computer-readable recording medium storing a computer program, which when executed by a computer, configures a computer to perform the method according to any one of claims 9 and 10.

* * * * *